(12) United States Patent
Naressi et al.

(10) Patent No.: US 10,108,698 B2
(45) Date of Patent: Oct. 23, 2018

(54) COMMON DATA REPOSITORY FOR IMPROVING TRANSACTIONAL EFFICIENCIES OF USER INTERACTIONS WITH A COMPUTING DEVICE

(71) Applicant: Accenture Global Services Limited, Dublin (IE)

(72) Inventors: Alexandre Naressi, Valbonne (FR); Christian Souche, Cannes (FR); Richard Vidal, Antibes (FR); Junmin Yang, Antibes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 525 days.

(21) Appl. No.: 14/845,395

(22) Filed: Sep. 4, 2015

(65) Prior Publication Data

US 2017/0011114 A1 Jan. 12, 2017

(30) Foreign Application Priority Data

Jul. 10, 2015 (EP) .................................... 15290181

(51) Int. Cl.
*G06F 17/30* (2006.01)
*G06N 99/00* (2010.01)

(52) U.S. Cl.
CPC .. *G06F 17/30625* (2013.01); *G06F 17/30011* (2013.01); *G06F 17/3071* (2013.01); *G06F 17/30684* (2013.01); *G06F 17/30705* (2013.01); *G06F 17/30719* (2013.01); *G06F 17/30734* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 4,972,349 A * | 11/1990 | Kleinberger | ........ G06F 17/3061 |
| 2008/0091423 A1 | 4/2008 | Roy et al. | |
| 2012/0198369 A1 | 8/2012 | Sorin et al. | |
| 2014/0188784 A1 | 7/2014 | Guerra | |
| 2014/0214753 A1 | 7/2014 | Guerra | |
| 2015/0189086 A1 | 7/2015 | Romano et al. | |

OTHER PUBLICATIONS

The Black Chamber date unknown [captured on Nov. 19, 2011 by archive.org], simonsingh.net, https://www.simonsingh.net/The_Black_Chamber/hintsandtips.html.*

(Continued)

*Primary Examiner* — Jason G Liao
(74) *Attorney, Agent, or Firm* — Mannava & Kang, P.C.

(57) ABSTRACT

Examples of the disclosure enable an information processing system to automatically generate a common data repository including a plurality of documents. In some examples, the information processing system is configured to analyze the documents to identify a plurality of topics. Based on the identified topics, the documents are classified into a plurality of sets. A set is associated with a corresponding topic. One or more correlations between the documents are identified and, based on the identified correlations, one or more user interaction tools are generated including an interaction script.

19 Claims, 6 Drawing Sheets

(56) References Cited

OTHER PUBLICATIONS

Chen, Topic Modeling the Sarah Palin Emails Jun. 27, 2011, blog.echen.me, http://blog.echen.me/2011/06/27/topic-modeling-the-sarah-palin-emails/.*

Varolii, Varolii Introduces New Technology to Improve and Simplify Inbound Customer Interactions Feb. 21, 2012 9am, marketwired. com, http://www.marketwired.com/press-release/varolii-introduces-new-technology-improve-simplify-inbound-customer-interactions-1622106.htm.*

Perugini et al., Personalizing Interactions with Information Systems 2003, Elviser, Advances in Computers vol. 57., p. 361.*

"The extended European search report" on European Patent Application No. 15290181.5, European Patent Office, dated Jan. 21, 2016, 11 pages.

* cited by examiner

| TIME | OPERATIONS PERFORMED IN TAXONOMY BUILD PHASE | OPERATIONS PERFORMED IN CLASSIFICATION PHASE | |
|---|---|---|---|
| 605 | RETREIVE DOCUMENTS FROM DATA SOURCE | | |
| 610 | EXTRACT TEXT FROM DOCUMENT | | |
| 615 | FORMAT TEXT | | |
| 620 | DETERMINE PARAMETER FOR EACH WORD | | |
| 625 | IDENTIFY MORE-RELEVANT WORDS | | |
| 630 | IDENTIFY TOPICS | | |
| 635 | CLUSTER DOCUMENTS BASED ON TOPIC | | |
| 640 | BUILD TAXONOMY TREE | | |
| | | CLASSIFY DOCUMENTS | 650 |
| | | ANALYZE DOCUMENTS | 655 |
| | | GENERATE INTERACTION SCRIPTS | 660 |

FIG. 6

COMMON DATA REPOSITORY FOR IMPROVING TRANSACTIONAL EFFICIENCIES OF USER INTERACTIONS WITH A COMPUTING DEVICE

CROSS-REFERENCE TO RELATED APPLICATION

This application claims priority to European Patent Application Number 15290181.5 filed Jul. 10, 2015 entitled "Common Data Repository for Improving Transactional Efficiencies of User Interactions with a Computing Device," which is incorporated herein by reference in its respective entirety.

BACKGROUND

Known methods and systems for managing user interactions include directing user interactions to one or more automated representatives or computing devices. Known methods and systems for improving a transactional efficiency of user interactions may be tedious, cumbersome, or time-consuming. Moreover, due at least in part on the volume of user interactions, user interactions are typically identified and/or analyzed on a reactionary or ad-hoc basis.

SUMMARY

Examples of the disclosure enable an information processing system to automatically generate a common data repository including a plurality of documents from a plurality of sources such that one or more computing devices may be automatically configured on a proactive basis to improve the transactional efficiency of user interactions with the one or more computing devices. The information processing system analyzes the documents to identify a plurality of topics including at least a first topic and a second topic. Based on the identified topics, the documents are classified into a plurality of sets including a first set associated with the first topic and a second set associated with the second topic. One or more correlations between the documents are identified and, based on the identified correlations, one or more user interaction tools are generated including an interaction script. The interaction script may be associated with a topic. For example, a first interaction script may be associated with the first topic, and a second interaction script may be associated with the second topic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an example sequence of operations that may be performed by a computing device, such as the computing device shown in FIG. 4.

Corresponding reference characters indicate corresponding parts throughout the drawings.

DETAILED DESCRIPTION

Figure 1:
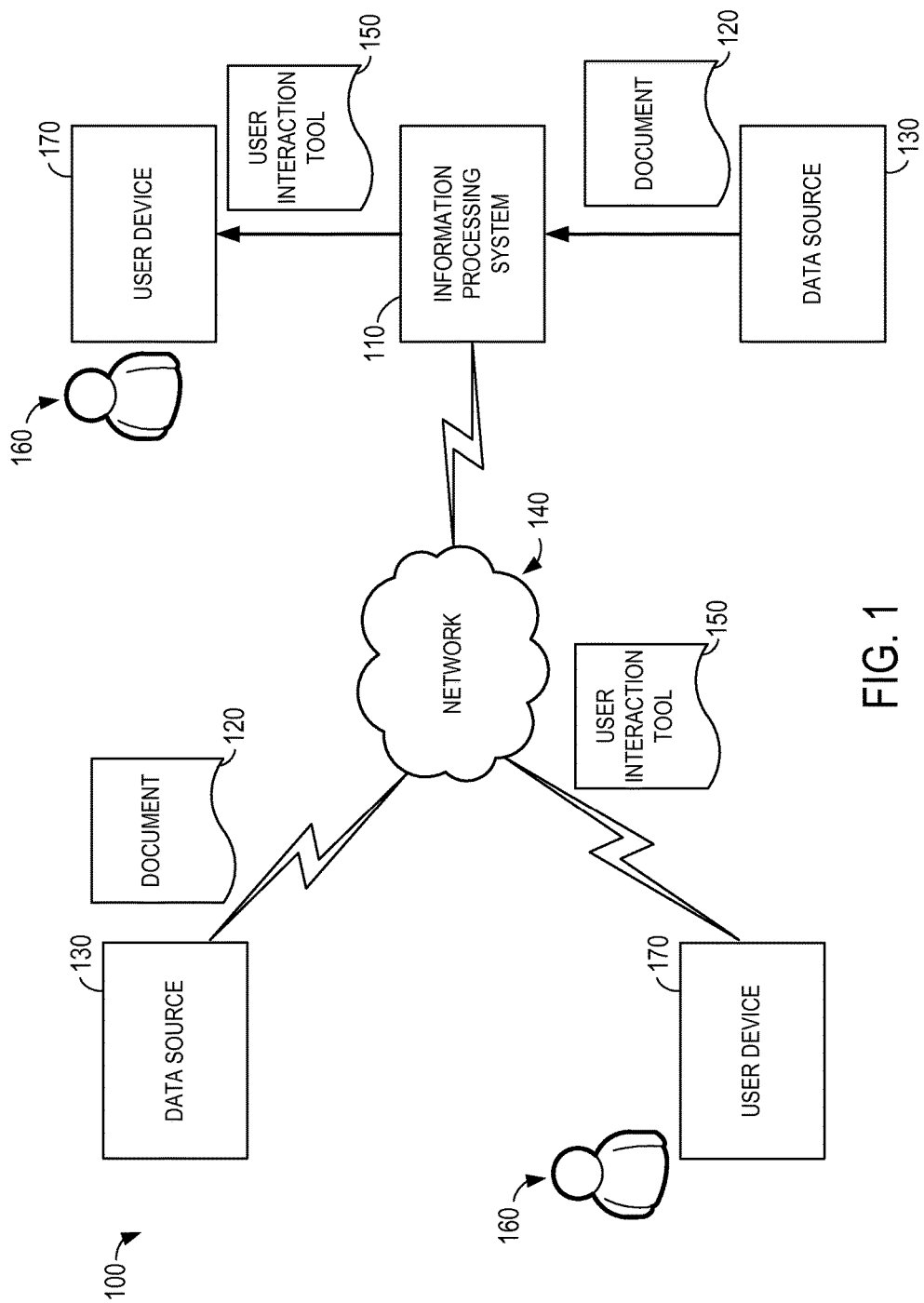
FIG. 1 is a diagram illustrating an example environment for generating a common data repository including data extracted from one or more user interactions.

The subject matter described herein relates generally to information processing and, more specifically, to automatically generating a common data repository including data from a plurality of sources that is used to improve the transactional efficiency of user interactions with one or more automated representatives or computing devices. Examples of the disclosure enable an information processing system to automatically generate a common data repository including a plurality of documents from a plurality of sources, thereby potentially improving a robustness and/or an effectiveness of the common data repository. Moreover, examples of the disclosure enable one or more user interaction tools, such as interaction scripts, to be automatically generated on a proactive basis, thereby potentially improving a transactional efficiency of user interactions with the one or more computing devices. Examples described herein enable a computing device to (i) analyze a plurality of documents to identify a plurality of topics, (ii) classify the documents into a plurality of sets, (iii) identify one or more correlations between one or more documents, (iv) generate one or more taxonomy trees, and (v) generate one or more user interaction tools.

Aspects of the disclosure enable a common data repository to be efficiently and effectively generated to include data extracted from one or more user interactions. Examples of the disclosure accelerate a data accumulation phase and/or an information structure phase to generate one or more user interaction tools, including an interaction script, in an organized, resource-efficient, and time-efficient manner. For example, a plurality of transcripts may be deconstructed into a plurality of components that are arranged in various combinations to construct one or more interaction scripts. In this way, the user interaction tools may be used by a plurality of automated representatives or computing devices to proactively manage user interactions and address topical issues in an efficient and organized manner, reducing overall resource load on the automated representatives or computing devices and/or requiring less instances of the automated representatives and/or fewer computing devices to accomplish a same quantum of user interactions.

By incorporating information from a plurality of sources in the manner described in this disclosure, some examples improve efficiency of user interactions by analyzing documents to identify topical issues and generating one or more user interaction tools to address the topical issues, enhance reliability of a common data repository by retrieving and incorporating data from a plurality of sources, improve communication between disparate systems by creating a forum to share or access information (e.g., the common data repository), improve system functionality by generating one or more user interaction tools based on sets of documents that satisfy a predetermined threshold, improve transactional efficiencies of user interactions by generating one or more user interaction tools, and/or reduce error rate by automating the analysis of documents, the classification of documents, the identification of correlations, the generation of taxonomy trees, and/or the generation of user interaction tools that may be used to address the topical issues.

The methods and systems described herein may be implemented using computer programming or engineering techniques including computer software, firmware, hardware or a combination or subset thereof, to implement operations including at least one of: a) retrieving a plurality of documents from a plurality of sources; b) determining a language associated with a document; c) extracting one or more snippets from a document; d) extracting text from a document; e) formatting text; f) identifying a frequency of words in a document; g) analyzing a document to identify a topic; h) classifying a document into a set; i) identifying one or more correlations between one or more documents; j) identifying a quantity of documents classified into a set; k) determining whether the quantity of documents classified into the set satisfies a predetermined threshold; l) generating a taxonomy tree; m) generating one or more interaction scripts; and n) generating one or more reports associated with the common data repository.

FIG. 1 illustrates an example environment 100 for developing a common data repository or automated user interaction platform in accordance with one example of the subject matter described herein. In the environment 100, an information processing system 110 (or other computing device) receives or retrieves a plurality of documents 120 from a plurality of data or knowledge sources 130.

Documents 120 may include call center transcripts, message boards, community forums, websites, Frequently Asked Question (FAQ) pages, social media conversations, and/or any other document associated with one or more customer service issues. Although only two documents 120 and two knowledge sources 130 are depicted, the environment 100 may include any number of documents 120 and/or knowledge sources 130 that enables the environment 100 to function as described herein. Even though the environment 100 relates to a customer service scenario, it should be noted that the present disclosure applies to various other environments in which a user interaction platform is developed based on one or more documents 120.

The information processing system 110 is coupled to one or more knowledge sources 130 via a network 140. The network 140 includes wireless and/or wired communication protocols and enables the information processing system 110 to communicate with one or more knowledge sources 130. Additionally or alternatively, the information processing system 110 may be directly coupled to one or more knowledge sources 130. The information processing system 110 may be coupled to the knowledge sources 130 in any manner that enables the environment 100 to function as described herein.

The information processing system 110 is configured to process the documents 120 and, based on the documents 120, generate one or more user interaction tools 150. User interaction tools 150 may include interaction scripts, conversation flows, reports, dashboards, and/or other tools that may be used to address or manage one or more customer service issues.

A user 160 may access one or more user interaction tools 150 generated at the information processing system 110 to address or manage one or more topical issues, including customer service-related issues. The user 160 may be a customer, a customer service representative, or any other person using, building, or editing the user interaction platform. For example, the user 160 may access one or more user interaction tools 150 to view, use, add, remove, and/or edit the user interaction tools 150. The user 160 may access one or more user interaction tools 150 via a user device 170 coupled to the information processing system 110. The user devices 170 are coupled to the information processing system 110 in any manner that enables the environment 100 to function as described herein. For example, the user devices 170 may be directly coupled to the information processing system 110 and/or coupled to the information processing system 110 via the network 140. In at least some examples, a user 160 may access one or more user interaction tools 150 directly at the information processing system 110. Although only two user interaction tools 150 and two user devices 170 are depicted, the environment 100 may include any number of user interaction tools 150 and/or user devices 170 that enables the environment 100 to function as described herein.

Figure 2:
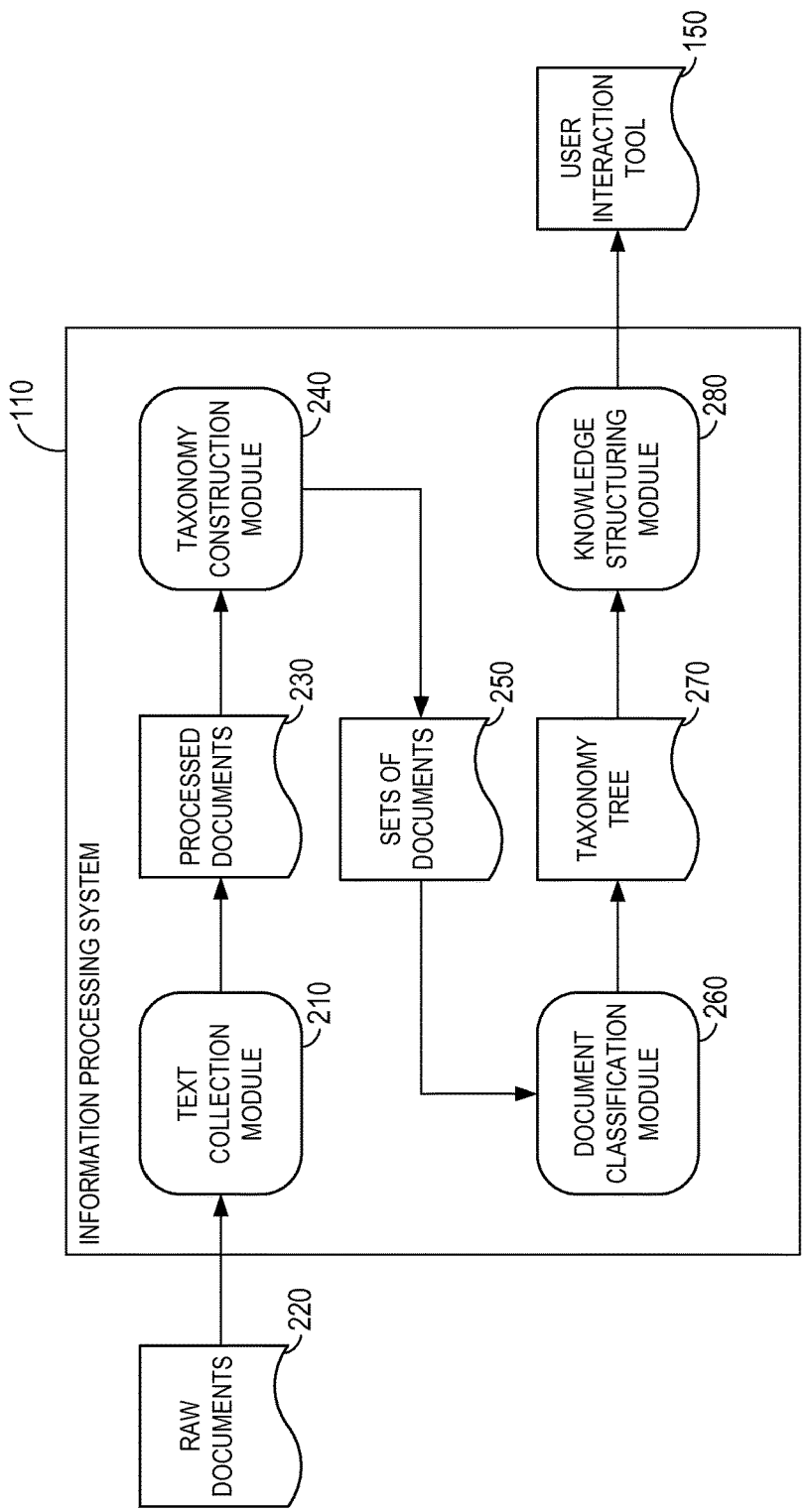
FIG. 2 is a block diagram illustrating example modules that may be used to generate a common data repository, such as the common data repository shown in FIG. 1.

FIG. 2 illustrates example modules that may be used to implement a user interaction platform. The information processing system 110 includes a text collection module 210 configured to receive or retrieve one or more documents 120 (shown in FIG. 1) or, more specifically, one or more raw documents 220 from a plurality of knowledge sources 130 (shown in FIG. 1). A "raw document" is a document that has not yet been processed. In one example, the text collection module 210 converts a batch of documents 120 (e.g., TXT files associated with emails) including content and metadata (e.g., timestamp) into a single document 120 (e.g., XML file) in a structured format prior to the single document 120 being processed. Alternatively, each document 120 of the batch of document 120 may be processed individually.

Each document 120 includes one or more snippets that may be extracted from the document 120. As used herein, "snippet" refers to one or more words or characters that are indicative of a thought or expression (e.g., a word, a phrase, a sentence). In at least some examples, the text collection module 210 identifies or detects signal words or characters (e.g., tags, periods, exclamation points, question marks, semicolons, commas) that are indicative of a beginning or an end of a thought or expression and extracts text (e.g., one or more snippets) based on the signal words or characters. For example, a document may include the following snippets:

<snippet><![CDATA[I'd like to find out the best way to resolve my issue with internet connection and speed on MyTelcoCompany]]></snippet>

<snippet><![CDATA[I am trying to start MyTelcoCompany Cloud but cannot as it instructs me to install it via . . . ]]></snippet>

The text collection module 210 is configured to format a document 120 to generate a processed document 230. In some examples, the text collection module 210 is configured to extract at least some text from a document 120 (e.g., raw document 220) to separate content from noise. Content includes any word or group of words that potentially enables a topic of the document 120 to be discovered or identified. Noise includes any character, group of characters, or formatting that provides little or no weight in discovering or identifying a topic of the document 120. Noise may include generic or stop words (e.g., a, an, the, and, or), sparse words (e.g., uncommon words, words not included in a predefined dictionary), capitalization, and/or punctuation.

Additionally or alternatively, the text collection module 210 may be configured to format at least some text to improve a functionality or usefulness associated with the text. For example, the text collection module 210 may stem words included in a document 120 (e.g., raw document 220). Stemming is performed to reduce a word to its root. In this way, the text collection module 210 formats a word such that the information processing system 110 does not distinguish between variations of the same root word. For another example, numbers written with letters (one, two, three, etc.) may be replaced by an Arabic numeral (1, 2, 3, etc.), or vice versa. The text collection module 210 may include or be coupled to a dictionary that enables noise to be removed and/or words to be stemmed. Alternatively, the text collection module 210 may use any formatting algorithm or model that enables the information processing system 110 to function as described herein. The example document above may be processed to include the following formatted snippets:

find best way resolv issu internet connect speed mytelcocompani tri start mytelcocompani cloud instruct instal via . . .

In at least some examples, the text collection module 210 may determine or detect a language associated with a document 120 (e.g., raw document 220) and apply a rule set associated with the detected language to format the document 120. The language may be detected, for example, based on signal words or any other frequently used words.

The information processing system 110 includes a taxonomy construction module 240 configured to analyze a document 120 (e.g., processed document 230) to mine the document 120 for content. For example, a document 120 may be analyzed to identify one or more frequently-used words and/or patterns of words. In some examples, the taxonomy construction module 240 is configured to determine a relative weight of each word or phrase based, at least in part, on a frequency of the word or phrase. A phrase includes a plurality of words that have one meaning or definition (e.g., "Main Street", "New York City").

For example, the taxonomy construction module 240 may identify a frequency of one or more words in a document 120. Additionally, the taxonomy construction module 240 may identify a frequency of one or more words in the plurality of documents 120. In this way, the taxonomy construction module 240 may calculate a TF-IDF (term frequency-inverse document frequency) value for each word in a document 120 to generate a term-frequency matrix including the calculated TF-IDF values. Generally, a TD-IDF value increases with each occurrence of a word within a document 120 and decreases with each occurrence of the word within the plurality of documents 120. Table 1 is a term-frequency matrix that includes a partial list of words included in the example document above and their respective TF-IDF values.

TABLE 1

TF-IDF values

| | Snippet 1 | Snippet 2 |
|---|---|---|
| best | 0.09 | 0 |
| cloud | 0 | 0.125 |
| connect | 0.09 | 0 |
| find | 0.09 | 0 |
| install | 0 | 0.125 |
| instruct | 0 | 0.125 |
| . . . | . . . | . . . |

The taxonomy construction module 240 may process the term-frequency matrix (e.g., Table 1) to separate more-relevant words (e.g., keywords) from less-relevant words. In at least some examples, the words are rank ordered based on their TF-IDF values. The taxonomy construction module 240 may implement any algorithm to retain a desired quantity of more-relevant words. In one example, the taxonomy construction module 240 implements a Latent Semantic Indexing (LSI) algorithm to retain a predetermined quantity of more-relevant words. In another example, the taxonomy construction module 240 implements an algorithm to retain one or more words associated with a TF-IDF value that satisfies a predetermined threshold, absolute (e.g., whether a word has a TF-IDF value that is greater than or equal to a predefined value) or relative (e.g., whether a word is in a predefined percentile of words based on TF-IDF value).

One or more documents 120 (e.g., processed documents 230) are analyzed to discover or identify a plurality of topics or concepts, including at least a first topic and a second topic, and construct a taxonomy based on the identified topics. As used herein, a "topic" refers to a subject, matter, or issue associated with one or more words and/or patterns of words. A topic includes a combination of words and/or other topics (e.g., subtopics). For example, the word "apartment" may be grouped with other forms of the same word (e.g., "apartments", "apt.") to form a semantic set associated with an "apartment" topic. Similarly, the word "flat" may be grouped with other forms of the same word to form a semantic set associated with a "flat" topic, and the word "studio" may be grouped with other forms of the same word to form a semantic set associated with a "studio" topic. The apartment topic may be grouped with other topics that include words that are synonymous with the word "apartment" (e.g., "flat" and "studio") to form a parent semantic set associated with an "apartment and synonyms" topic. That is, in this example, the "apartment and synonyms" topic includes the "apartment" topic, the "flat" topic, and the "studio" topic. Similarly, the "apartment and synonyms" topic may be grouped with other topics that include words that are similar with the words included in the "apartment and synonyms" topic to form another semantic set (e.g., a grandparent semantic set). For example, an "apartment and house" topic may include the "apartment and synonyms" topic and a "house and synonyms" topic that is constructed in a similar manner as the "apartment and synonyms" topic.

The taxonomy construction module 240 may employ, for example, a latent dirichlet allocation (LDA) model to group one or more words together and identify one or more topics associated with the group. A plurality of documents 120 may be clustered or classified into a plurality of sets 250, including a first set 250 and a second set 250, based on one or more topics. For example, the first set 250 may be associated with a first topic, and the second set 250 may be associated with a second topic. In some examples, a document 120 associated with a plurality of topics may be classified in a plurality of sets 250. Alternatively, a document 120 associated with a plurality of topics may be classified in a set 250 that corresponds to one topic of the plurality of topics (e.g., a topic relevant to the document 120). The taxonomy construction module 240 may determine a topic frequency based on a number of documents 120 classified in a set associated with a topic.

The information processing system 110 includes a document classification module 260 configured to identify one or more patterns or correlations between one or more documents 120 classified in the same or a common set 250 (e.g., intra-set comparison). Additionally or alternatively, the document classification module 260 may identify one or more patterns or correlations between one or more documents 120 classified in the first set 250 and one or more documents 120 classified in the second set 250 to determine or identify one or more patterns or correlations between the first topic and the second topic (e.g., inter-set comparison). The document classification module 260 groups one or more documents 120 based on similarities. For example, the documents 120 may be grouped based on customer service-related issue (e.g., recovering a personal identification number or PIN).

The document classification module 260 is configured to generate a taxonomy tree 270 based on one or more intra-set comparisons and/or inter-set comparisons. A taxonomy tree 270 includes a plurality of nodes that are each associated with a respective topic. The nodes are arranged based on the intra-set comparisons and/or inter-set comparisons. That is, the taxonomy tree 270 represents a relationship or correlation between a plurality of topics. The document classification module 260 may determine a topic complexity based on a number of subtopics and/or a number of levels associated with a topic. The taxonomy tree 270 may include any number of topics including any number of levels that enables the information processing system 110 to function as described herein. The taxonomy tree 270 is representative of one or more relationships between data and/or topics.

The information processing system 110 includes a knowledge structuring module 280 configured to structure information and generate one or more user interaction tools 150 based on the taxonomy tree 270. For example, a batch of topics associated with the taxonomy tree 270 may be converted or transformed into a structured knowledge article having a predetermined format (e.g., "Issue Case: 'AAA,' Customer Query: 'BBB,' Diagnostic: 'CCC,' Resolution: 'DDD,'" wherein "AAA," "BBB," "CCC," and "DDD" are representative of content associated with an issue case, a customer query, a diagnostic, and a resolution, respectively.). For example, an interaction script may be generated for a topic based on one or more identified patterns of one or more documents 120 associated with the topic. Additionally or alternatively, one or more reports or dashboards associated with the user interaction platform may be generated based on one or more documents 120 associated with the topic. In this manner, information extracted from a plurality of documents 120 may be arranged in a first format associated with an interaction script, a second format associated with a report, and a third format associated with a dashboard.

In at least some examples, it is determined whether a quantity of documents 120 in a set 250 satisfies a predetermined threshold, absolute (e.g., whether a set 250 has a quantity of documents 120 that is greater than or equal to a predefined number) or relative (e.g., whether a set 250 is in a predefined percentile of sets 250 based on a quantity of documents 120). Upon determining that the quantity of documents 120 satisfies the predetermined threshold, one or more user interaction tools 150 (e.g., an interaction script 300) are generated for a corresponding topic based on the documents 120 classified in the set 250.

In at least some examples, a sample of documents 120 may be extracted from a corpus of documents 120 to identify one or more topics and/or to generate a taxonomy tree 270, and a remainder of the corpus of documents 120 may be processed based on the identified topics and/or the generated taxonomy tree 270. For example, the document classification module 260 may classify one or more documents 120 based on an established taxonomy tree 270 (e.g., a taxonomy tree generated based on a previous batch of documents 120) and/or the knowledge structuring module 280 may identify one or more user interaction tools 150 (e.g., a conversation flow) based on a topic of a document 120. In at least some examples, a document 120 may be compared to one or more documents 120 classified in each set 250 to determine a match or fit with the set 250. For example, a first parameter may be determined based on a comparison of a document 120 with one or more documents 120 classified in a first set, and a second parameter may be determined based on a comparison of the document 120 with one or more documents classified in a second set. In such an example, the document 120 may be classified in the set 250 associated with the parameter indicative of a better match or fit.

Figure 3:
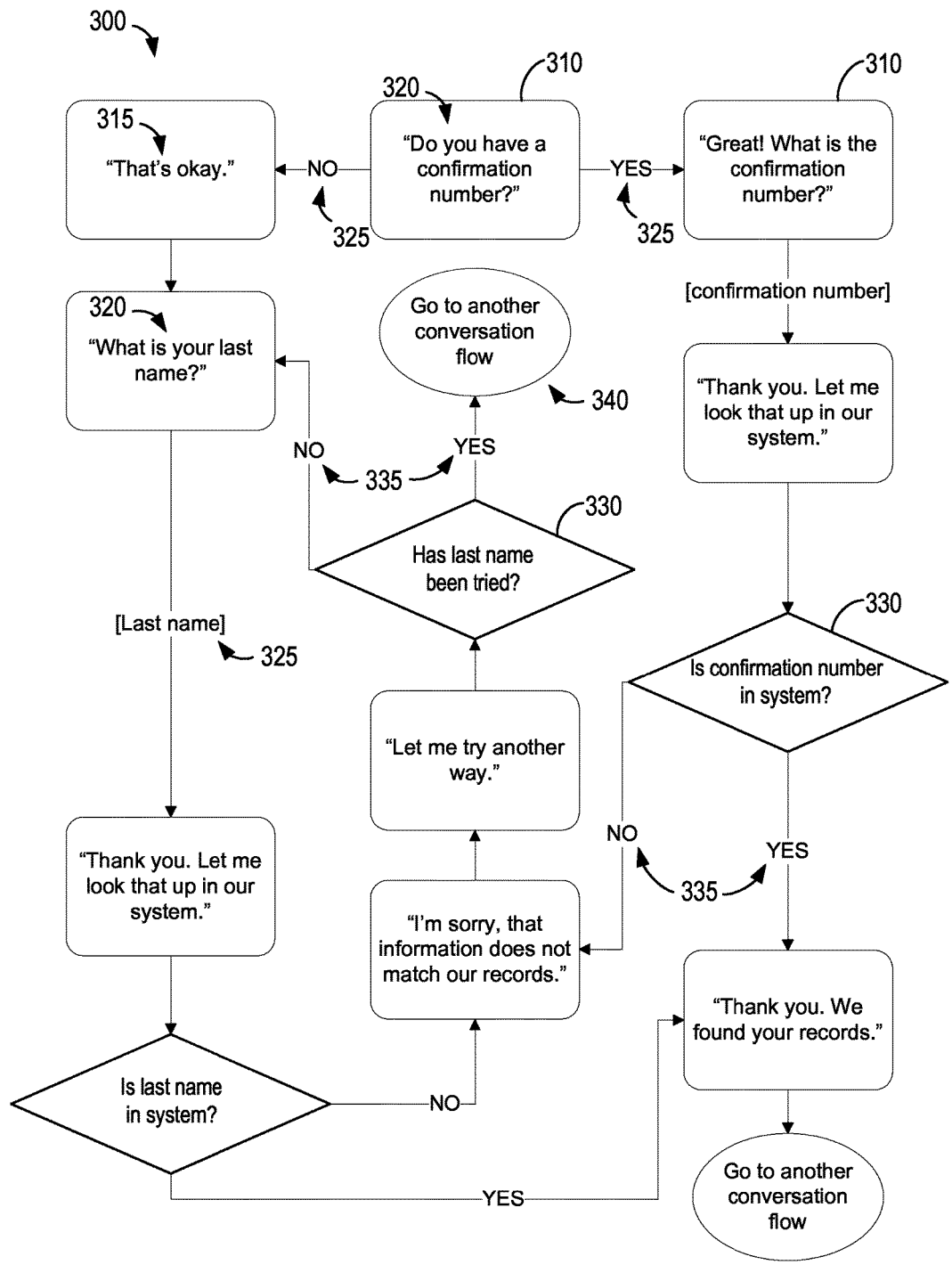
FIG. 3 is a block diagram illustrating an example interaction script that may be generated from a common data repository, such as the common data repository shown in FIG. 1.

FIG. 3 illustrates an example interaction script 300 that may be generated based on the taxonomy tree 270. The interaction script 300 is associated with a corresponding topic and includes a plurality of conversation elements 310 including one or more sentences 315 and one or more questions 320. A sentence 315 is a conversation element 310 that does not seek or require a response from the user (e.g., a customer). A question 320 is a conversation element 310 that seeks or requires a response 325 from the user to proceed to another conversation element 310.

When a user response 325 is received in response to a question 320, the information processing system 110 may use the text collection module 210, for example, to process the user response 325 such that the user response 325 corresponds with one response of a plurality of anticipated user responses 325. For example, the information processing system 110 may process a user response 325 of "Yes, in fact, I do" to be interpreted as a user response 325 of "Yes." When a user response is 325 not received or understood, the question 320 may be repeated until a response 325 is received, or the information processing system 110 may use a predetermined default response 325 and proceed to another conversation element 310.

In some examples, the information processing system 110 implements an operation (e.g., a determination operation 330) that seeks or requires a response 335 from within the information processing system 110 (e.g., another module) or from a source other than the user (e.g., another computing device or database). In some examples, the interaction script 300 may be linked to other interaction scripts 300 that correspond to other topics to interact with the user in a natural, uninterrupted manner and address one or more other customer service-related issues. In at least some examples, the interaction scripts may be arranged as a decision tree for automated assistance programming.

In one example, an information processing system 110 may receive a user input of ""What classes are available?", "What classes are there?", "Which classes do you have?", "Which classes do you provide?", or another user response 325 including the term "class." The information processing system 110 may process the user input and interpret or understand the user input as "What classes do you offer?" In some examples, the information processing system 110 processes user input based upon content (e.g., the words used in the user input), context (e.g., previous user input), and/or other characteristic or quality of the user input (e.g., inflection, intonation, tone, pitch accent). User input may trigger or prompt an action that is less perceivable to the user (e.g., logging a value in a system or database) or an action that is more perceivable to the user (e.g., starting a live chat session, making a phone call). In response to this user input, the information processing system 110 may provide a response of "We offer the following classes" and access another transaction script to continue the user interaction.

In another example, an information processing system 110 may receive a user input of ""How can I prove my identity?", "How do I prove my identity?", "How to prove my identity?", "What document can prove my identity?", or another user response 325 including the term "identity." The information processing system 110 may process the user input and interpret or understand the user input as "How can I prove my identity?" In response to the user input, the information processing system 110 may prompt the user for additional information by responding with "Are you a citizen or a non citizen?" Upon determining that the user is a citizen, the information processing system 110 may provide a response of "As proof of identity, please provide your driver's license . . . ." Upon determining that the user is not a citizen, the information processing system 110 may provide a response of "Acceptable immigration documents include your . . . ."

Figure 4:
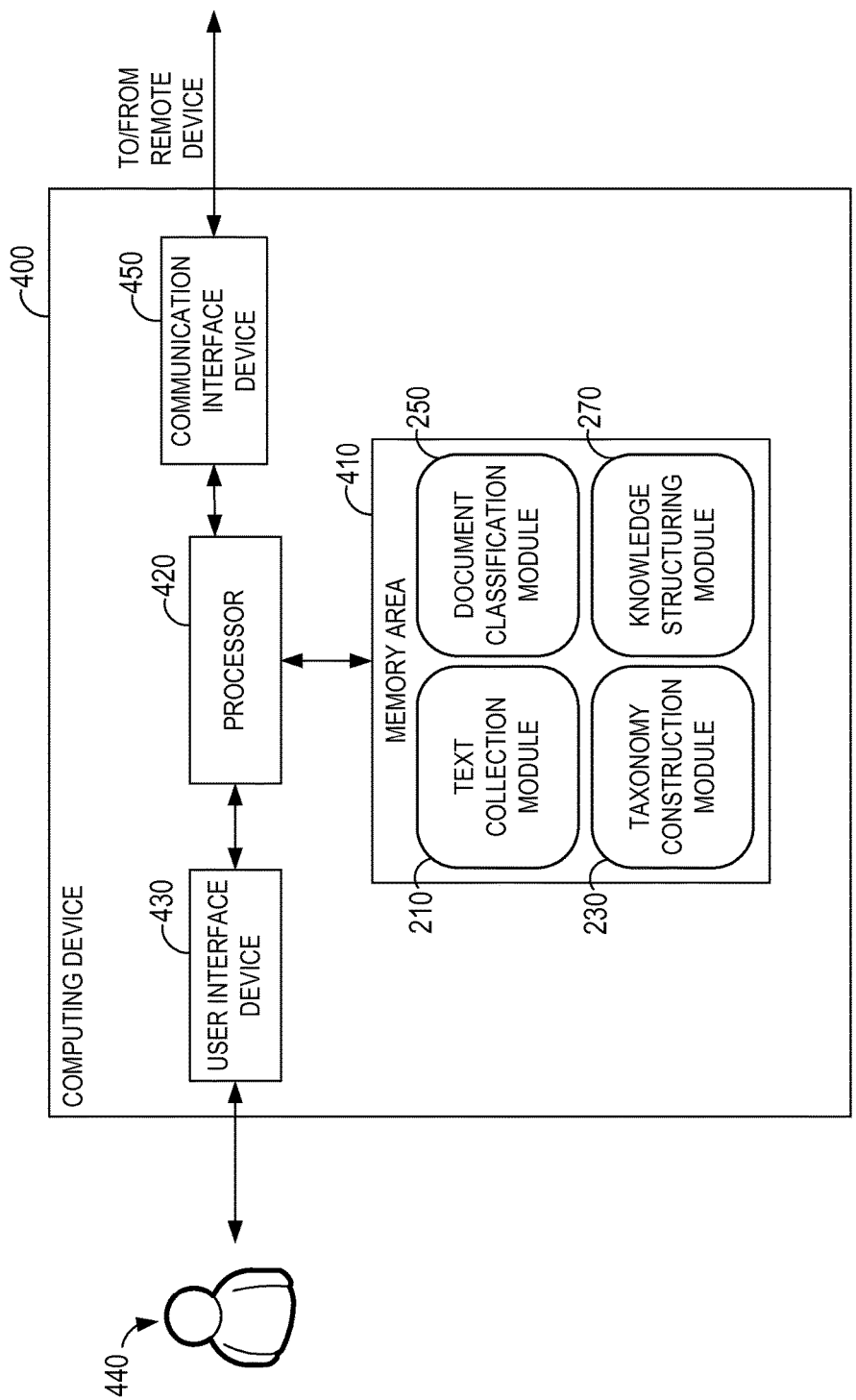
FIG. 4 is a schematic diagram illustrating an example computing device that may be used to generate a common data repository, such as the common data repository shown in FIG. 1, or an interaction script, such as the interaction script shown in FIG. 3.

FIG. 4 illustrates an example computing device 400. While some examples of the disclosure are illustrated and described herein with reference to a computing device being an information processing system, a knowledge source, and/or a user device, aspects of the disclosure are operable with any computing device that executes instructions to implement the operations and functionality associated with the computing device. The computing device 400 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 400 may represent a group of processing units or other computing devices. Additionally, any computing device described herein may be configured to perform any operation described herein including one or more operations described herein as being performed by another computing device.

The computing device 400 includes one or more computer-readable media, such as a memory area 410 storing computer-executable instructions, a text collection module 210, a taxonomy construction module 240, a document classification module 260, a knowledge structuring module 280, or other data, and one or more processors 420 programmed to execute the computer-executable instructions for implementing aspects of the disclosure. The memory area 410 includes any quantity of media associated with or accessible by the computing device. The memory area 410 may be internal to the computing device (as shown in FIG. 4), external to the computing device (not shown), or both (not shown).

The processor 420 includes any quantity of processing units, and the instructions may be performed by the processor 420 or by multiple processors within the computing device or performed by a processor external to the computing device. The processor 420 is programmed to execute instructions such as those illustrated in the figures (e.g., FIGS. 5 and 6).

The processor 420 is transformed into a special purpose microprocessor by executing computer-executable instructions or by otherwise being programmed. For example, the text collection module 210, when executed by the processor 420, causes the processor 420 to retrieve a plurality of documents from a plurality of knowledge sources, determine a language associated with a document, extract one or more snippets from a document, extract text from a document, and/or format text; the taxonomy construction module 240, when executed by the processor 420, causes the processor 420 to analyze one or more documents to identify a plurality of topics, identify a frequency of words in a document, and/or classify a document to a set; the document classification module 260, when executed by the processor 420, causes the processor 420 to identify one or more patterns in one or more documents classified in a set, identify a quantity of documents classified in a set, determine whether the quantity of documents classified in the set satisfies a predetermined threshold, and/or generate a taxonomy tree by determining one or more correlations between one or more documents classified in one set and one or more documents classified in another set; and the knowledge structuring module 280, when executed by the processor 420, causes the processor 420 to generate one or more interaction scripts and/or generate one or more reports associated with the information processing system 110. Although the processor 420 is shown separate from the memory area 410, examples of the disclosure contemplate that the memory area 410 may be onboard the processor 420 such as in some embedded systems.

The computing device 400 may include at least one user interface device 430 for exchanging data between the computing device 400 and a user 440 (e.g., user 160). The user interface device 430 includes or is coupled to a presentation device configured to present information, such as text, images, audio, video, graphics, alerts, and the like, to the user 440. The presentation device may include, without limitation, a display, a speaker, or a vibrating component. Additionally or alternatively, the user interface device 430 includes or is coupled to an input device configured to receive information, such as user commands, from the user 440. The input device may include, without limitation, a controller, a camera, a microphone, or an accelerometer. In at least some examples, the presentation device and the input device are integrated in a common user interface device 430 configured to present information to the user 440 and receive information from the user 440. The user-interface device may include, without limitation, a capacitive touch screen display, or a controller including a vibrating component.

The computing device 400 includes at least one communication interface device 450 for exchanging data between the computing device 400 and a remote device (e.g., a computer-readable media, another computing device). In at least some examples, the information processing system 110 is directly coupled to the knowledge source 130 and/or the user device 170 or coupled to the knowledge source 130 and/or the user device 170 via the network 140. Communication between the computing device 400 and a computer-readable media or another computing device may occur using any protocol or mechanism over any wired or wireless connection.

The block diagram of FIG. 4 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 4 may be performed by other elements in FIG. 4, or a computing device (e.g., a particularly-configured processor, web service, server, application, etc.) not shown in FIG. 4.

Figure 5:
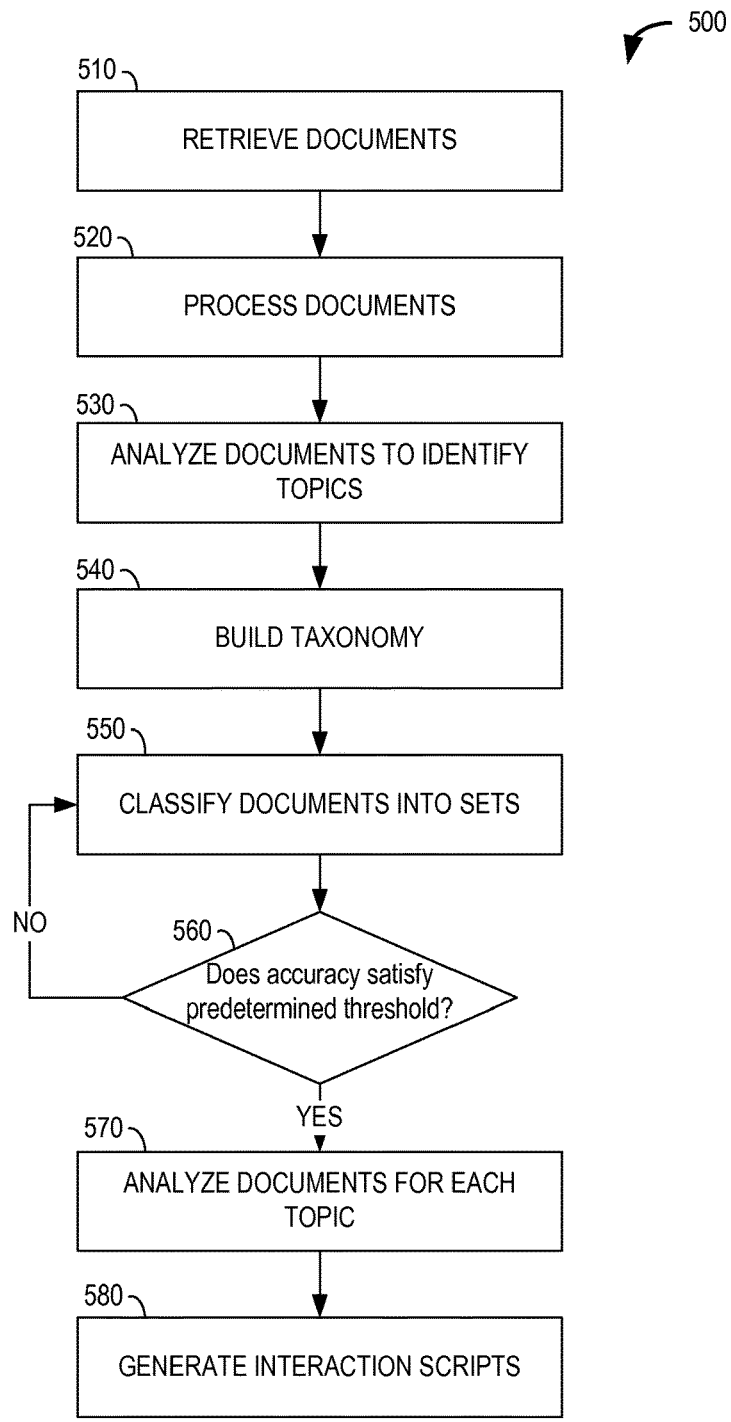
FIG. 5 is a flowchart illustrating an example method of generating a common data repository, such as the common data repository shown in FIG. 1.

FIG. 5 illustrates an example method 500 of developing a common data repository to generate user interaction tools. At 510, a plurality of documents 120 are received or retrieved from one or more sources 130. The documents 120 may be, for example, transcripts from customer service calls. Documents 120 are collected from internal sources and/or external sources to robustly capture customer interactions and behavior data.

At 520, the documents 120 are processed to facilitate identifying relevant information. The documents 120 are deconstructed into component parts to extract information from the documents 120. For example, the documents 120 may be processed such that noise is removed from the document 120 and/or words identified in the document 120 are stemmed. In at least some examples, each document 120 includes one or more snippets, and each snippet includes one or more words.

The documents 120 are analyzed at 530 to identify one or more topics. For example, one or more topics may be identified by implementing text-mining algorithms to identify keywords and/or patterns and correlations between documents 120 and/or its component parts. The documents 120 are clustered based on the identified topics (e.g., documents 120 associated with a first topic are grouped into a first set 250, and documents 120 associated with a second topic are grouped into a second set 250) and, at 540, a taxonomy tree 270 is built or generated based on the clustered documents 120. In at least some examples, a document classification training set may be created by computing, for example, semantic similarity (e.g., cosine similarity using Latent Semantic Indexing). The taxonomy tree 270 may be iteratively refined as new documents 120 are received or retrieved.

A plurality of documents 120 are classified into sets at 550 using the document classification training set. In at least some examples, one or more documents 120 are automatically classified using supervised machine learning. For example, some combination of various algorithms, including Support Vector Machine (SVM), General Linearized Models, Maximum Entropy, Scaled Linear Discriminant Analysis (SLDA), and Bagging, may be used to classify the documents 120.

It is determined at 560 whether an accuracy of the classification satisfies a predetermined threshold. Classification results are inspected by comparing a topic of a classified document with a topic of a set in which the document is classified to facilitate improving the classification model. In at least some examples, the classification results are manually validated. The document classification training set may be iteratively refined based on an accuracy of the classification.

Upon determining that an accuracy of the document classification training set satisfies the predetermined threshold, the documents 120 are analyzed for each topic at 570. In at least some examples, it is determined whether a topic is associated with a set that includes a quantity of documents 120 that meets or exceeds a predetermined threshold. Upon determining that the quantity of documents meets or exceeds the predetermined threshold, the contents of the documents 120 are analyzed using automatic processing and/or manual analysis including name entity recognition, keyword extraction, and/or relationship extraction (e.g., subject, verb, object).

One or more interaction scripts are generated for a topic at 580 based on one or more documents 120 associated with the topic. One or more interaction scripts may be generated based on the deconstruction and analysis of customer service calls. The interaction scripts are generated to address topical issues (e.g., customer service-related issues). The interaction scripts may be used with a digital assistant, for example, at a website or automated call center. In at least some examples, the interaction scripts include predefined prompts that prompt the user 160 and/or the information processing system 110 for information. The information processing system 110 may retrieve information internally (e.g., from within the information processing system 110) and/or externally (from one or more sources 130 remote from the information processing system 110). For example, the information processing system 110 may retrieve information from a customer information database, a billing system, a repository of digital content).

FIG. 6 illustrates a sequence of example stages of the knowledge discovery phase and/or the knowledge structure phase described herein. Specifically, the first (left) column shows one or more operations that may be performed during a taxonomy build stage, and the second (right) column shows one or more operations that may be performed during a classification stage.

During the taxonomy build phase, a plurality of documents 120 are retrieved from one or more knowledge sources 130 at 605. The documents 120 are processed by extracting text from one or more documents 120 at 610, and formatting the extracted text at 615. The formatted text may be interpreted as words (or stemmed words), and a parameter may be calculated or determined for one or more words at 620. For example, each word may be associated with a respective TD-IDF value. Based on the parameter, one or more words are identified as being more-relevant than other words at 625. At 630, one or more topics are identified for each document 120 based on one or more words associated with the document 120. The documents 120 are clustered into sets 250 at 635 based on the identified topics. In at least some examples, one or more patterns or correlations are identified between one or more documents 120 or sets 250 to build a taxonomy tree at 640. During the taxonomy build phase, one or more documents 120 are analyzed to generate a framework within which the herein-described information processing system operates.

During the classification phase, subsequent documents 120 are processed to identify a topic associated with each document 120 and classify the document 120 in a set 250 based on the identified topic at 650. In at least some examples, one or more documents 120 are analyzed at 655 to identify or anticipate potential issues and/or solutions associated with a topic. One or more interaction scripts are generated at 660 to facilitate addressing user interaction issues. During the classification phase, one or more documents 120 are processed within the framework generated during the taxonomy build phase.

The subject matter described herein enables a user interaction platform to be automatically configured to provide various capabilities including generating interaction scripts, reports, dashboards, and/or other user interaction tools. In this way, the information processing system may be used by a plurality of users to address customer service issues in an efficient and effective manner.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for automatically developing a user interaction platform. For example, the elements illustrated in FIGS. 1, 2, and 4, such as when encoded to perform the operations illustrated in FIGS. 5 and 6 constitute at least an example means for analyzing a plurality of documents to identify a plurality of topics; an example means for classifying a plurality of documents into a plurality of sets; and an example means for generating one or more interaction scripts.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

retrieving a plurality of documents from a plurality of data sources;

analyzing a plurality of documents to identify a plurality of topics;

determining a language associated with one or more documents;

extracting one or more snippets from one or more documents;

extracting text from one or more documents;

formatting text;

identifying a frequency of one or more words associated with text;

classifying a plurality of documents into a plurality of sets;

identifying one or more correlations between one or more documents;

identifying one or more correlations between a first document classified into a first set of a plurality of sets and another document classified into the first set;

identifying one or more correlations between a first document classified into a first set of a plurality of sets and another document classified into a second set of the plurality of sets;

identifying a quantity of documents classified into a first set of the plurality of sets;

determining whether the identified quantity of documents satisfies a predetermined threshold;

generating a taxonomy tree;

generating one or more user interaction tools including an interaction script associated with a corresponding topic of the plurality of topics; and generating one or more user interaction tools including a report associated with the common data repository.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. An information processing system comprising:
a memory area storing computer-executable instructions for generating a common data repository including a plurality of documents that include transcripts from customer service calls; and
a processor configured to execute the computer-executable instructions to:
identify a plurality of topics including customer service issues by analyzing the plurality of documents;
based on the plurality of identified topics, classify the plurality of documents into a plurality of sets, a first set of the plurality of sets associated with a first topic of the plurality of topics;
identify via inter-set comparisons, one or more correlations between a first document classified into the first set and another document of the plurality of documents classified into a second set of the plurality of sets, the second set being associated with a second topic of the plurality of topics;
based on the one or more identified correlations, generate a taxonomy tree;
convert at least the first topic and the second topic of the plurality of topics into a structured knowledge article having a predetermined format of patterns based on the generated taxonomy tree; and
generate one or more tools including an interaction script associated with at least the first topic of the plurality of topics based on identification of one or more of the patterns from at least the first document and the other document to improve a transactional efficiency of a user interaction.

2. The information processing system of claim 1, wherein the processor is configured to execute the computer-executable instructions to retrieve the plurality of documents from a plurality of data sources.

3. The information processing system of claim 1, wherein the processor is configured to execute the computer-executable instructions to determine a language associated with one or more documents of the plurality of documents.

4. The information processing system of claim 1, wherein the processor is configured to execute the computer-executable instructions to extract one or more snippets from one or more documents of the plurality of documents.

5. The information processing system of claim 1, wherein the processor is configured to execute the computer-executable instructions to:
extract text from one or more documents of the plurality of documents; and
format the extracted text.

6. The information processing system of claim 1, wherein the processor is configured to execute the computer-executable instructions to:
extract text from one or more documents of the plurality of documents; and
identify a frequency of one or more words associated with the extracted text.

7. The information processing system of claim 1, wherein the interaction script corresponds to the second topic.

8. The information processing system of claim 1, wherein the processor is configured to execute the computer-executable instructions to:
identify a quantity of documents classified into the first set; and
determine whether the identified quantity of documents satisfies a predetermined threshold, wherein the interaction script is generated upon determining that the identified quantity of documents satisfies the predetermined threshold.

9. The information processing system of claim 1, wherein the processor is configured to execute the computer-executable instructions to, based on the plurality of documents, generate one or more reports associated with the common data repository.

10. The information processing system of claim 1, wherein the memory area stores further computer-executable instructions that cause the processor to:
prompt, via a digital assistant, a user for information based on predefined prompts in the interaction script.

11. The information processing system of claim 10, wherein the memory area stores further computer-executable instructions that cause the processor to:
link the interaction script including a conversational element to one or more other interaction scripts; and
enable automated assistance programming by arranging the interaction scripts as a decision tree.

12. The information processing system of claim 11, wherein the memory area stores further computer-executable instructions that cause the processor to:
implement a determination action wherein the automated assistance programming seeks a response to the conversational element from another computing device.

13. A computer-implemented method for generating a common data repository, the method comprising:
retrieving a plurality of documents that include transcripts from customer service calls from a plurality of data sources;
analyzing the plurality of retrieved documents to identify a plurality of topics including at least a first topic and a second topic wherein the first topic and the second topic relate to customer service issues;
based on the plurality of topics, classifying the plurality of documents into one of a first set or a second set, the first set associated with the first topic, the second set associated with the second topic;
identifying via inter-set comparisons, one or more correlations between a first document classified into the first set and another document classified into the second set;
based on the one or more correlations, generating a taxonomy tree;
converting at least the first topic and the second topic of the plurality of topics into a structured knowledge article having a predetermined format of patterns based on the generated taxonomy tree; and
generating one or more tools including an interaction script associated with at least the first topic of the plurality of topics based on identification of one or more of the patterns from at least the first document and the second document.

14. The computer-implemented method of claim 13, further comprising determining a language associated with one or more documents of the plurality of documents.

15. The computer-implemented method of claim 13, further comprising extracting one or more snippets from one or more documents of the plurality of documents.

16. The computer-implemented method of claim 13, further comprising:
extracting text from one or more documents of the plurality of documents; and
formatting the extracted text.

17. The computer-implemented method of claim 13, further comprising:

extracting text from one or more documents of the plurality of documents; and identifying a frequency of one or more words associated with the extracted text.

18. The computer-implemented method of claim 13, further comprising:

identifying a quantity of documents classified into the first set; and determining whether the identified quantity of documents satisfies a predetermined threshold, wherein the interaction script is generated upon determining that the identified quantity of documents satisfies the predetermined threshold.

19. A computer-readable storage device having computer-executable instructions embodied thereon, wherein the computer-executable instructions cause a processor to:

retrieve a plurality of documents from a plurality of data sources;

identify a plurality of topics including at least a first topic and a second topic by analyzing the plurality of documents;

classify the plurality of documents into one of a first set or a second set based on the plurality of identified topics with the first set being associated with the first topic and the second set being associated with the second topic;

identify via inter-set comparisons, one or more correlations between a first document classified into the first set and another document classified into the second set;

generate a taxonomy tree based on the one or more correlations;

convert at least the first topic and the second topic into a structured knowledge article having a predetermined format of patterns based on the generated taxonomy tree; and generate one or more tools based on the generated taxonomy tree, the one or more tools including at least an interaction script associated with at least the first topic of the plurality of topics based on identification of one or more of the patterns from at least the first document and the second document.

* * * * *

UNITED STATES PATENT AND TRADEMARK OFFICE
CERTIFICATE OF CORRECTION

PATENT NO. : 10,108,698 B2
APPLICATION NO. : 14/845395
DATED : October 23, 2018
INVENTOR(S) : Alexandre Naressi et al.

Page 1 of 1

It is certified that error appears in the above-identified patent and that said Letters Patent is hereby corrected as shown below:

On the Title Page

At Item (30), Foreign Application Priority Data "15290181" should be "15290181.5".

Signed and Sealed this
Nineteenth Day of February, 2019

Andrei Iancu
*Director of the United States Patent and Trademark Office*